Figure 1:
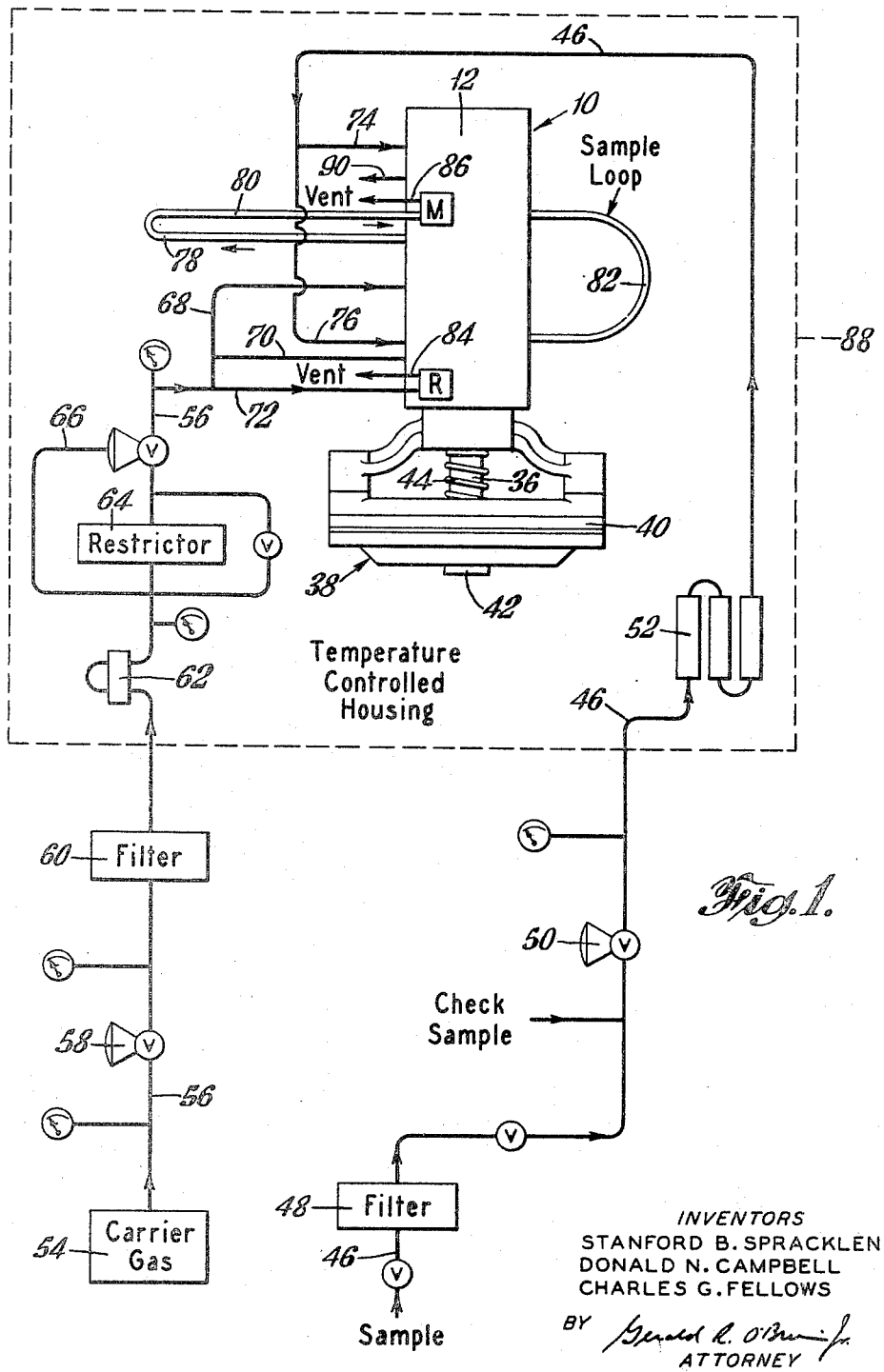

INVENTORS
STANFORD B. SPRACKLEN
DONALD N. CAMPBELL
CHARLES G. FELLOWS
BY Gerald R. O'Brien Jr.
ATTORNEY

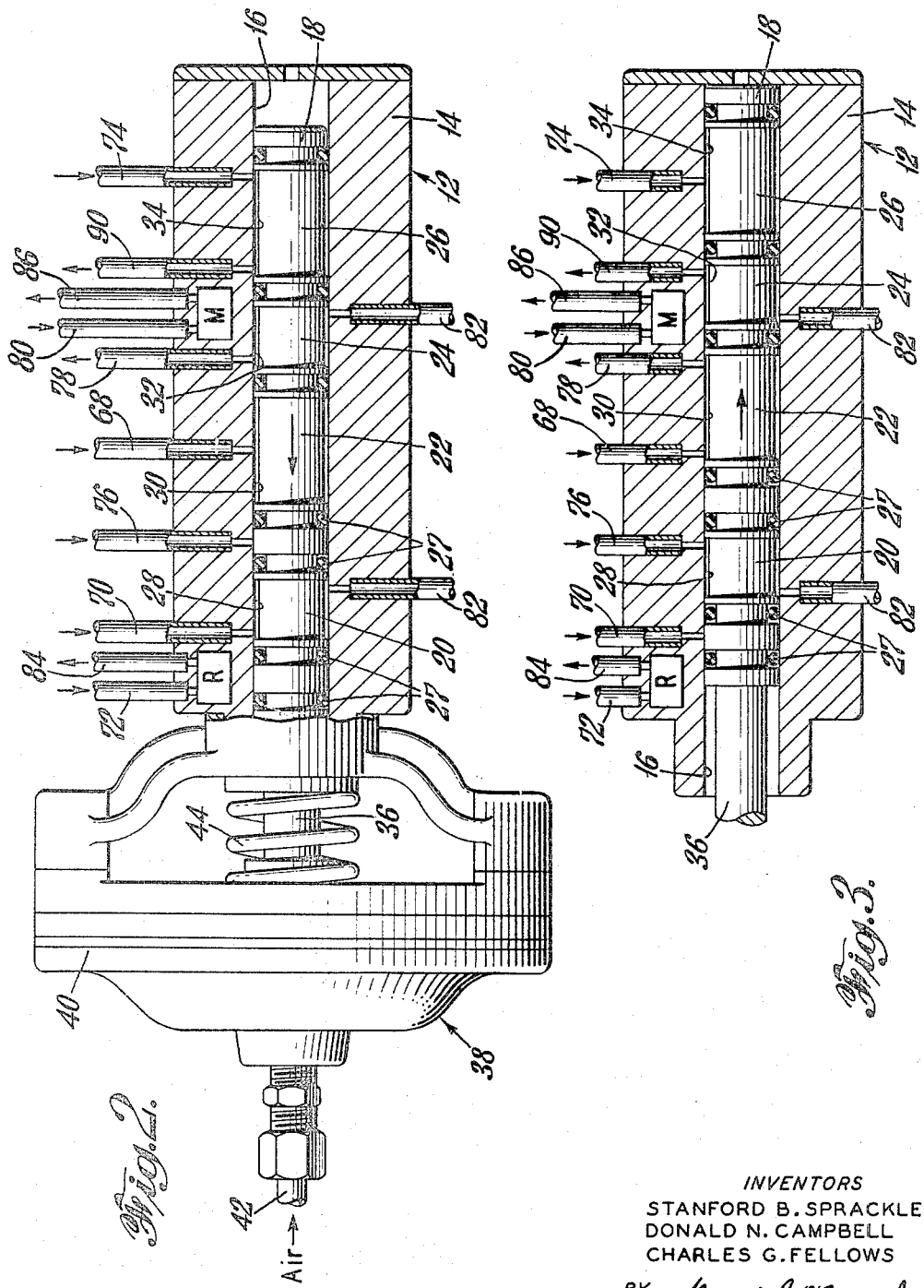

United States Patent Office 3,041,869
Patented July 3, 1962

3,041,869
VAPOR FRACTION ANALYZER
Stanford B. Spracklen, Hurricane, Donald N. Campbell, St. Albans, and Charles G. Fellows, Alum Creek, W. Va., assignors to Union Carbide Corporation, a corporation of New York
Filed Sept. 11, 1956, Ser. No. 609,160
3 Claims. (Cl. 73—23)

The present invention relates to a vapor fraction analyzer and, more particularly, to a vapor fraction analyzer capable of continuously measuring for the percentage of each component in a multi-component gas and/or vapor sample stream.

Heretofore, many types of vapor fraction analyzers have been proposed to effect measurements based on vapor phase chromatography principles. As set forth in an article entitled, "Application of Vapor Phase Chromatography in the Gas-Analytical Field" by Van de Craats, Analytica Chimica Acta vol. 14 (1956) pages 136–149, analysis of multi-component vapor samples may be effected by a variety of procedures including elution-partition and adsorption-displacement methods. In a typical elution-partition method, a continuous flow of carrier gas, such as helium, is supplied at a constant rate of flow through a reference thermal conductivity cell and on to a sample injection point. There the liquid or gas to be analyzed is injected directly into the carrier stream. The mixture of carrier gas and sample flows into the partition separating column, packed with an inert support coated with a high boiling point organic liquid. Since all components of the multi-component sample vary in partition coefficients and time they are retained on the column materials, each component of the mixture will travel through the column at a different speed to form the basis for resolution of the multi-component sample into its components. As each component elutes separately from the column, it is passed to a measuring thermal conductivity cell where a change in the composition causes an unbalance in the detector circuit which is recorded. In this manner, a series of symmetrical peaks, deviating from a reference established by the helium carrier gas, permits quantitative measurement of the components of the multi-component sample.

It is important to provide means in the analyzer for accomplishing the complete resolution or separation of the components of the vapor sample. In order to impart to the analyzer the greatest practical resolving power it is necessary to provide: that the sample enters the column with a minimum of dilution caused by difusion with the carrier gas; that the effluent binaries (carrier gas plus a component of the multi-component vapor sample) enter the measuring cell with a minimum of interposed volume so that successive binaries will not overlap before entering and result in destroying resolution; and that, to insure a stable condition of measurement for the reference and measuring cells, both of these cells must be made essentially insensible to pressure, i.e., the density of the carrier gas in the reference cell must be maintained essentially constant and that the gas in both cells must be maintained at constant absolute pressures.

In addition, it is important to provide a maximum magnitude of output signal for each component of the sample vapor and to provide that the continuous analysis of the same sample vapor produces an identical magnitude in output signal. It has been found that, in order to insure that this condition is obtained, the flow of carrier gas must be maintained constant and at an optimum value. Should the carrier gas flow be very slight, the sample will diffuse throughout the system resulting in the loss in resolution and in magnitude of the differential output signal. On the other hand, if the rate of flow of carrier gas is excessive, the component peaks move toward each other and reduce in magnitude so that again both resolution and output signal strength suffer.

Further, it is important that, for repetitive analysis of the same sample composition, the time of transit of and the magnitude of a given binary through the measuring cell must always be the same for repetitive recordings. Still further, the volume of each successive multi-component sample to be analyzed must be identical. Since the measurement is proportional to the difference between the thermal characteristics (i.e., the combined thermal conductivity and heat capacity characteristics) of the carrier gas and that of the effluent binary mixtures, it is necessary to maintain the reference cell, the measuring cell, the carrier gas, the fixed volume of multi-component sample vapor, and the separating column at the same substantially constant value of ambient temperature.

It is, therefore the prime object of the present invention to provide a multi-component vapor fraction analyzer, operating on vapor phase chromatographic principles, which is simple in construction and capable of satisfying the above requirements necessary for high resolution and sensitivity in separating and measuring the various components of the vapor sample.

In the drawing:
FIG. 1 is a schematic diagram of an analyzer embodying the invention;
FIG. 2 is a partial sectional view of the linear valve and pneumatic diaphragm assembly shown in the apparatus of FIG. 1, wherein the linear valve is in the "air-off" position; and
FIG. 3 is a sectional view of the linear valve of FIG. 2 showing the valve in the "air-on" position.

In accordance with the present invention and referring to the embodiment of the drawings, a multi-component vapor phase chromatographic analyzer is provided having cell block assembly 10 of suitable material such as aluminum, stainless steel and the like containing a linear valve 12 comprising an outer housing member 14 having an internal cylindrical boring 16 and positioned therein an inner cylindrical piston member 18 capable of being moved axially in boring 16. Piston member 18 is provided with a series of reduced diameter sections 20, 22, 24 and 26 which are separated by O-ring seals 27 of rubber or the like to provide a series of non-communicating annular spaces 28, 30, 32 and 34 between the outer surfaces of the reduced diameter sections and the inner walls of internal boring 16. A plurality of gas conduits communicate through the housing member 14 of linear valve assembly 12 with these annular spaces.

One end 36 of piston member 18 extends from housing member 14 and communicates with suitable linear valve drive assembly 38. The drive assembly of the embodiment of the drawing comprises an outer housing 40 and an internal diaphragm (not shown) which, when actuated by air pressure introduced into the drive assembly through conduit 42, drives piston 18 to the right against the force of spring 44. The position of valve piston member 18 with respect to the housing member 14, when in the normal or "air-off" position, is shown in FIG. 2 of the drawing. The position of the piston 18 with respect to the housing 14, in the driven or "air-on" position, is shown in FIG. 3 of the drawing.

Referring specifically to FIG. 1 of the drawing, a multi-component gas sample is continuously introduced to the analyzer through line 46 containing filter 48, pressure regulator 50 and heat exchanger 52. Concurrently therewith, a suitable carrier gas such as helium, hydrogen, nitrogen, carbon dioxide or the like, is introduced from container 54 through line 56, containing pressure regulator 58, filter 60, heat exchanger 62, flow restrictor 64, and flow controller 66. Heat exchangers 52 and 62 are employed to maintain the incoming carrier gas and sample vapor streams at substantially constant temperatures.

The carrier gas stream in conduit 56 is divided into three separate streams 68, 70 and 72 for passage into the cell block assembly 10. Similarly, the sample vapor stream in conduit 46 is divided into separate streams 74 and 76 before entry in the cell block assembly 10. The cell block assembly 10 communicates with inlet 78 and outlet 80 of separating column. A sample loop 82 is provided, communicating between two points in the housing 14 of linear valve 12.

A suitable thermistor reference cell R, such as type A 111 Veco bead thermistor, as sold by Victory Engineering Corporation, is provided in the valve housing member 14 of the cell block assembly 10 for measuring the thermal characteristics of the carrier gas stream, and a similar thermistor measuring cell M is provided in valve housing member 14 of the cell block assembly 10 for measuring the thermal characteristics of successive binary mixtures of carrier and component gases. Vent conduits 84 and 86 are respectively provided for permitting the passage of carrier gas from the reference cell and binary mixtures from the measuring cell. As shown in FIG. 1 of the drawing, the entire assembly of cell block 10, linear valve drive assembly 38, supply conduits and heat exchangers are housed in temperature equalized and controlled housing 88.

The following is a description of an operation of the multi-component vapor phase analyzer of the invention.

A carrier gas, for example helium, is first passed at a selected rate of flow from the supply container 54 through conduit 56 to conduits 68, 70 and 72. The stream entering the cell block through conduit 72 passes through the reference thermistor cell R and is vented through line 84 from the apparatus. Concurrently therewith, the second carrier gas stream, entering the cell block through conduit 70, passes through annular space 28 to the sample loop 82, the linear valve being in the "air-off" position shown in FIG. 2 and, after purging the sample loop in this manner, passes through annular space 32 and inlet 78 of the separating column. This stream is then discharged from the exit end of the column directly through the measuring cell M integrally positioned in cell block 10 and is then vented through conduit 86. The third carrier gas stream, entering the linear valve assembly through conduit 68, is arrested when the valve piston 18 is in the "air-off" position. Similarly, two sample vapor streams enter the system through conduit 46 and, in turn conduits 74 and 76. The piston 18 in the "air-off" position arrests the flow of sample vapor through conduit 76. The second stream of sample vapor, entering the linear valve through conduit 74, passes through annular space 34 and is vented through conduit 90.

After the analyzer is thus purged on this portion of the cycle, the air drive assembly is actuated causing the piston to move to the position shown in FIG. 3 of the drawing. Under these conditions, the carrier gas stream previously entering through conduit 70 is arrested, and the carrier gas stream in conduit 68, previously arrested, flows through annular space 30 and inlet 78 of the separating column to elute components of vapor sample from the column. Concurrently therewith, the sample gas stream through conduit 76, previously arrested, passes through annular space 28 to sample loop conduit 82, annular space 32 and conduit 90, thereby venting to the atmosphere.

The flow of sample vapor previously flowing through conduit 74 is arrested. The sole purpose in providing for the flow of sample vapor through conduit 74 when the valve is in the "air-off" position, is to keep a steady flow of sample vapor throughout this portion of the cycle to insure a fresh supply of sample vapor on the line when the valve is activated to the "air-on" position.

Upon the return of the piston 18 to the "air-off" position shown in FIG. 2 after a predetermined period of time, a fixed volume of sample vapor will be trapped in the sample loop 82 and, when the carrier gas stream passes through conduit 70 and annular space 28, this trapped volume of sample vapor is forced through annular space 32 and inlet 78 of the separating column where it is held either physically or chemically depending upon the selection of the column packing material.

On the successive "air-on" portion of the cycle, the continuous passage of carrier fluid through conduits 68 and 78 to the column packing material produces successive elution of the components of the multi-component vapor sample which components successively pass from exit 80 of the separating column as binary mixtures with the carrier gas to the measuring cell M where thermal conductivity of each binary mixture is measured. A comparison of the thermal characteristics of the binary mixture of carrier gas and a component is compared with the thermal characteristics of the carrier gas alone, as measured in the reference cell R which is simultaneously operated. A wide variety of known electrical bridge circut arrangements may be employed to compare the output signals of the reference and measuring cells and obtain a differential signal proportional to the quantity of component eluted with the carrier gas. In this manner, successive readings of or a recording of output signal intensity may be employed to obtain a measurement of the quantity of each component of the multi-component sample vapor in its order of elution from the separating column.

The vapor phase chromatographic analyzer of the invention has been operated employing helium, hydrogen, carbon dioxide and other gases as the carrier gas to effect the following analytical functions: single stream, single component control; single stream, single component monitor; single stream, single component control and monitor for a specified number of components up to eight; and with two streams, one component of one stream control and monitor with a specified number of components up to eight in each stream.

In addition, the analyzer of the invention has been employed in conjunction with a partition column, an absorption column and an adsorption column to effect separation of the components of the multi-component mixture.

In one example, an analyzer embodying the invention was employed to quantitatively measure the following constituents in a multi-component mixture:

i-Butane
n-Butane
Butene-1 and i-butene
Butene-2 and butadiene

In this example a 3-foot, ¼-inch diameter partition column containing celite (diatomaceous earth) coated with acetonylacetone was employed and the measurement was conducted at 60° C. Helium was employed as the eluting gas at a flow rate at 200 cc. per minute. Vapor samples 2 cc. in volumes were successfully tested and the eluting times for the various components of the mixture were as follows:

| | Minutes |
|---|---|
| i-Butane | 1.6 |
| n-Butane | 2 |
| Butene-1 and i-butene | 2.5 |
| Butene-2 | 3.25 |
| Butadiene | 4 |

The linear valve was actuated on a 5½-minute cycle with the valve in the "air-on" position for 5 minutes and the valve in the "air-off" position for 30 seconds.

In another example, an analyzer embodying the invention was employed to quantitatively measure the following constituents in a multi-component mixture:

$$N_2$$
$$CH_4$$
$$C_2H_6$$
$$C_3H_8$$

A 6 foot, ¼-inch diameter adsorption column containing 30–50 mesh activated alumina was employed at 50° C. Hydrogen was employed as the carrier gas. Vapor samples 1 cc. in volume were successfully tested and the eluting times for the various components of the mixture were as follows:

| | Minutes |
|---|---|
| $N_2$ | 0.33 |
| $CH_4$ | 0.375 |
| $C_2H_6$ | 1.25 |
| $C_3H_8$ | 4.6 |

The linear valve was actuated on a 5½-minute cycle with the valve in the "air-on" position for 5 minutes and the valve in the "air-off" position for 30 seconds.

A wide variety of analyzers embodying the invention have been constructed and tested on time cycles varying from 5 to 20 minutes per cycle with the valve in the "air-on" position for about 95 percent of the cycle. It has been found that helium is an ideal carrier gas for employment with most multi-component vapor samples since it is a low adsorbing gas and differs greatly in thermal characteristics from most of the other gases that will be encountered.

It is, of course, to be understood that the vapor phase analyzer of the invention is not limited to use with columns operating on the elution principle, but is also capable of use with columns operating on the adsorption-displacement principle.

What is claimed is:

1. In a multi-component vapor fraction analyzer, flow control means to provide simultaneous continuity of flow in at least two fluid streams, comprising an outer housing member and an internal member slideably engaged in said outer housing member and moveable between two registering positions with respect to passages of said outer housing member; said housing member having positioned therein reference cell means for developing an output signal proportional to the thermal characteristics of a reference gas, measuring cell means for developing output signals proportional to the thermal characteristics of successive specific components of vapor sample, outlet and inlet means for directly connecting to the inlet and outlet respectively of a sample passage means which is suitable for a periodic trapping therein of constant volumes of multi-component vapor samples, means for connecting the inlet of a separation column to said outlet of sample passage means through said housing member, and means for connecting the outlet of said separation column to the inlet of said measuring cell means through said housing member.

2. In a multi-component vapor fraction analyzer, flow control means in accordance with claim 1, wherein said outer housing member and internal member comprise a two-way linear valve actuated by controlled drive means which, in operation, provides for the trapping of constant successive volumes of sample vapor in said sample passage means in one axial position of said valve, and provides for the driving of each of said successive volumes into said column by reference gas acting as a carrier when said valve is in the other axial position.

3. In a multi-component vapor fraction analyzer, flow control valve means to provide simultaneous continuity of flow in at least two fluid streams comprising a stationary valve member and a moveable valve member slideably engaged thereto and moveable between two registering positions with respect to passages of said stationary valve member; said stationary member having positioned therein reference cell means for developing an output signal proportional to the thermal characteristics of a reference gas, measuring cell means for developing output signals proportional to the thermal characteristics of successive specific components of vapor sample, outlet and inlet means for directly connecting to the inlet and outlet respectively of a sample passage means which is suitable for the periodic trapping therein of constant volumes of multi-component vapor samples, means for connecting the inlet of a separation column to said outlet of said sample passage means through said stationary valve member, and means for connecting the outlet of said separation column to the inlet of said measuring cell means through said stationary valve member.

References Cited in the file of this patent

UNITED STATES PATENTS

| 2,619,409 | Spracklen | Nov. 25, 1952 |
| 2,757,541 | Watson et al. | Aug. 7, 1956 |
| 2,826,908 | Skarstrom | Mar. 18, 1958 |
| 2,833,151 | Harvey | May 6, 1958 |
| 2,868,011 | Coggeshall | Jan. 13, 1959 |

OTHER REFERENCES

Article: Chromatographic Analysis of Hydrocarbons, Bradford et al. in Journal at Institute of Petroleum, vol. 41, 1955, pages 80–89. (Copy in 73–23c.)

Publication: Article, "Chromatography of Gases and Vapors" by Littlewood et al. published in Journal of Chemical Society No. 2, 1955, pages 1480–1483. (Copy in 73–23c.)

Article: "Analyzing Hydrocarbon Mixtures" by Podbielniak and Preston in The Oil and Gas Journal, April 16, 1956, pages 212–217. (Copy in 73–23c.)